United States Patent [19]
Mechis

[11] Patent Number: 5,074,020
[45] Date of Patent: Dec. 24, 1991

[54] VEHICULAR TOOL

[76] Inventor: Andrew Mechis, 443 John Street, Thunder Bay, Ontario, Canada, P7B 1X6

[21] Appl. No.: 539,894

[22] Filed: Jun. 18, 1990

[51] Int. Cl.[5] ........................ B23P 19/04
[52] U.S. Cl. ........................ 29/252
[58] Field of Search ........................ 29/252, 251, 259, 260, 29/262, 266, 264

[56] References Cited

U.S. PATENT DOCUMENTS 3,337,943 8/1967 Powell ........................ 29/261
3,883,941 5/1975 Coil ........................ 29/259
4,129,931 12/1978 Carrigan ........................ 29/252

*Primary Examiner*—Robert C. Watson
*Attorney, Agent, or Firm*—Hoffman, Wasson & Gitler

[57] ABSTRACT

A tool is provided for removing a spindle extending from the wheel assembly of a motor vehicle from its corresponding spindle support. Such a spindle has a first end fixed to the wheel assembly, a middle region that is wedged into a spindle support, and free end that extends outwardly from the spindly support. The present invention is a tool comprised of a frame, attachment means to engage the frame to the spindle support in a spaced apart relation thereto, and means to support a hydraulic press positioned between the frame and the free end, the press being adapted to apply a force between the frame and spindle support and push the spindle out of its associated spindle support.

2 Claims, 3 Drawing Sheets

VEHICULAR TOOL

The present invention relates to a tool, intended for use in repairs of automobiles and other motor vehicles, to disengage a wheel spindle from its associated spindle support.

The spindle of an automobile is typically comprised of a tapered shaft extending from a disk, which may be a brake disk; the disk is engaged to a wheel of the vehicle. The spindle is generally engaged to an associated spindle support by means of the shaft of the spindle being tightly wedged into a corresponding tapered aperture within the spindle support. In order to remove the spindle from the aperture, it is necessary to apply a powerful pushing force, and this should preferably be accomplished without damaging any of the wheel components.

One such device known in the art is comprised of a steel plate, which is engaged, in a spaced-apart relation, to the spindle support by two bolts attached to one end of the plate and a brace at the other end of the plate. The brace is adapted to be releasable engaged to the strut rod support. A sturdy bolt is threaded into an aperture in the steel plate aligned with the free end of the spindle. Continued turning of the bolt applies a pushing force against the spindle. This existing device suffers three disadvantages. First, it is difficult to obtain sufficient leverage to apply the necessary pushing force to remove the spindle from its socket. Second, the device has a tendency to damage the relatively delicate threaded end portion of the spindle when sufficient force is applied to remove the spindle. Third, the strut rod must be disassembled in order to engage the tool to the strut rod support, and this is a lengthy process in which the rubber bushing of the strut rod must often be destroyed.

The present device is an improved spindle-removing tool that makes use of a hydraulic press to apply a pushing force to the spindle.

Several devices exist that remove gears and the like from a shaft onto which they have been wedged, by means of a hydraulic press. For example, Canadian Patent 1,113,228 (Altmeyer) discloses a device comprised of a hydraulic press in the form of a ring that surrounds a shaft. The press expands longitudinally, causing a gear wedged onto the shaft to be removed.

The present device is a tool to remove a spindle from its socket; the tool is comprised of:

(a) a support frame;

(b) means to fixedly engage the frame to the spindle support;

(c) a hydraulic press adapted to be positioned between a portion of the frame and the free end of the spindle, and to apply a force therebetween.

In a preferred embodiment, the device is adapted for use on the rear wheel assembly of a Corvette (TM) automobile and is provided with a collar adapted to convey the pushing force of the hydraulic press directly to a widened lower portion of the spindle, in order to minimize damage to the more delicate upper portion of the spindle. The preferred embodiment is further provided with a hinged strut clamp having a two prongs at the free end thereof and a connecting bolt joining the ends of the prongs. The strut clamp may be engaged to a strut rod support without removing the strut rod therefrom, by removing the connecting bolt, inserting the prongs over the base of the strut rod support, and reinserting the bolt.

In the drawings which illustrate embodiments of the invention,

The spindle of an automobile and its associated elements will now be described.

Figure 9:
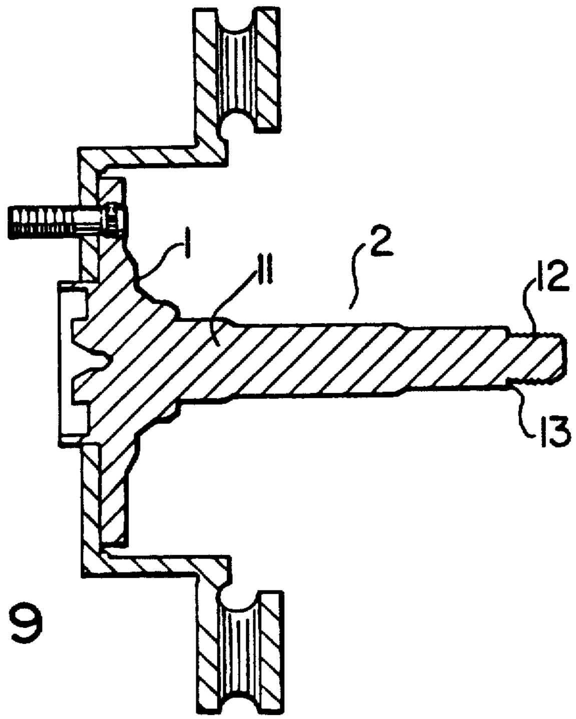
FIG. 9 is a cross-sectional view of a spindle and associated brake disk.

Referring to FIG. 9, a brake disk 1 of a Corvette automobile is illustrated. A spindle 2 extends axially from the middle of the brake disk. The spindle is comprised of a relatively thick inner tapered portion 11 adjacent the brake disk 1, and a thinner outer threaded portion 12 adjacent the free end of the spindle. A shoulder 13 separates the thicker inner portion 11 and thinner outer portion 12.

Figure 1:
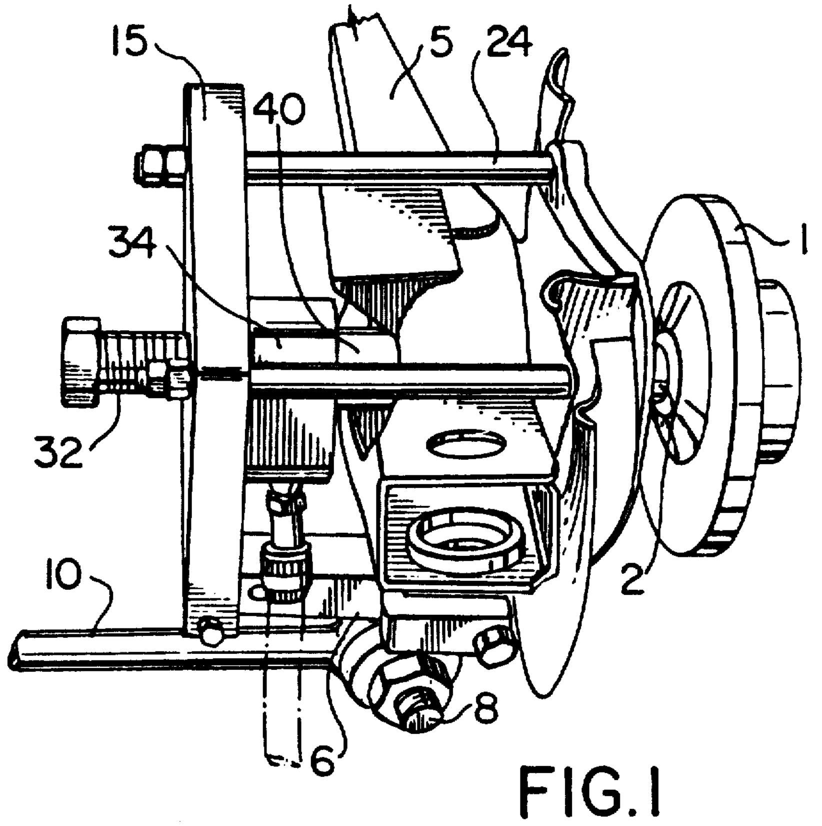
FIG. 1 is a perspective view of the device, positioned on a rear wheel assembly of an automobile.

Referring to FIG. 1, the brake disk 1, the spindle 2 and surrounding elements are illustrated, with the tool positioned to remove the spindle. The spindle is engaged to a tapered socket, not shown, within the spindle support 3, which is illustrated in FIG. 9. A torque control arm 5 is mounted to the spindle support 3 and extends radially therefrom.

Figure 8:
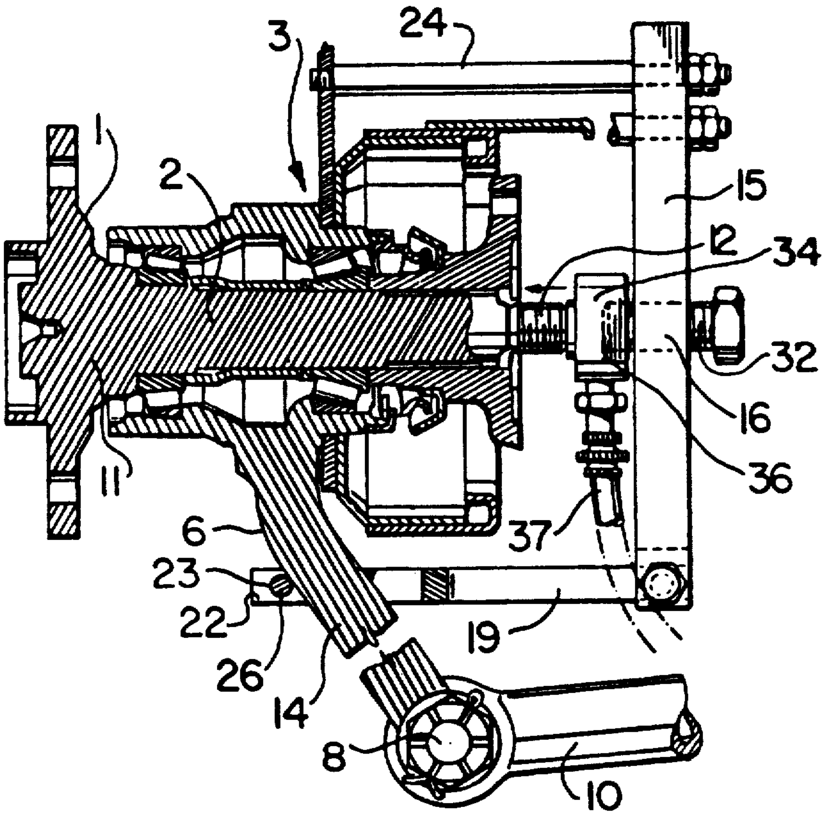
FIG. 8 is an elevational view, partly in cross-section, illustrating the device positioned on a rear wheel assembly of an automobile and showing parts of the rear wheel assembly removed.

Referring to FIG. 8, a strut rod support 6 is mounted to the spindle support. The strut rod support is comprised of a relatively narrow neck 14 and two arms 8 extending laterally therefrom. Each arm 8 receives a strut rod 10 mounted thereto.

It will be seen that the spindle 2 may be removed from the socket of the spindle support 3 by applying a powerful pushing force against the free, threaded end 12 of the spindle 2, and that such pushing force must be braced against the spindle support 3 or elements fixed thereto.

Figure 3:
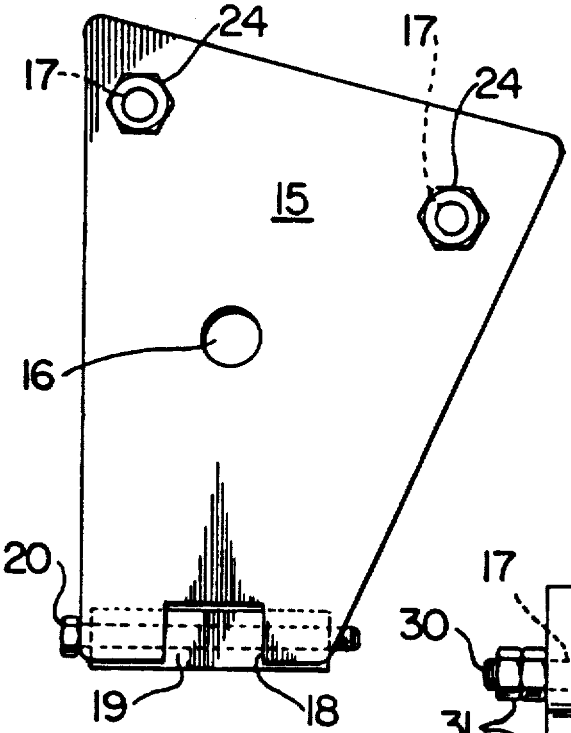
FIG. 3 is a plan view of the body of the device.
Figure 4:
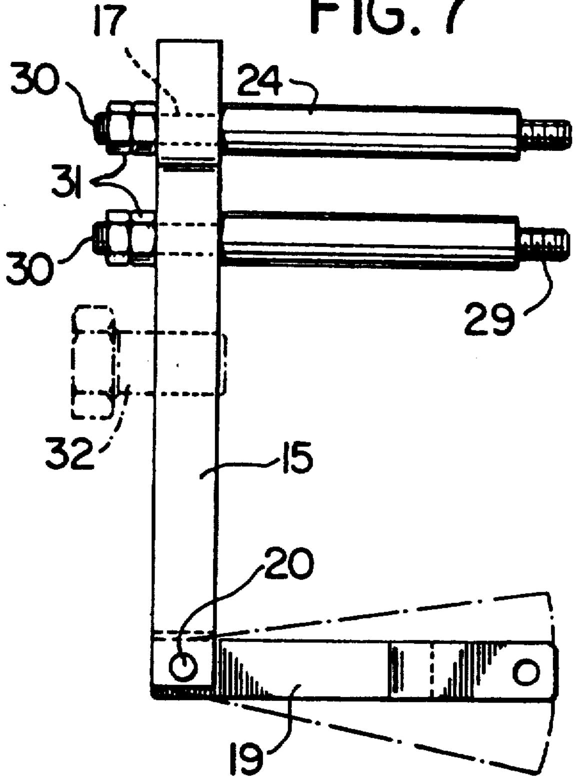
FIG. 4 is a side elevational view of the body of the device.

The spindle removing tool will now be described. Referring to FIGS. 3 and 4, the spindle removing tool has a frame comprised of a flat plate 15 having a threaded central aperture 16. Two rods 24 depend from the plate 15 and engage it to the spindle support in a spaced-apart relationship. Each rod 24 is rotatably engaged to the plate 15 within an aperture 17 within one end of the plate 15.

Each rod 24 is comprised of an elongate body, a first threaded end 29 adapted to be threaded into corresponding threaded apertures, not shown, in the spindle support 3, and a second threaded end 30. The second threaded end 30 extends through the corresponding aperture 17 in the plate 15. The aperture 17 is unthreaded to allow the rod 24 to rotate freely therein. Each rod 24 is engaged to the plate 15 by two nuts 31 threaded onto and welded to the exposed part of the second threaded end 30. The rods 24 are positioned such that the first threaded ends 29 correspond with the threaded apertures provided in the spindle support 3.

Figure 5:
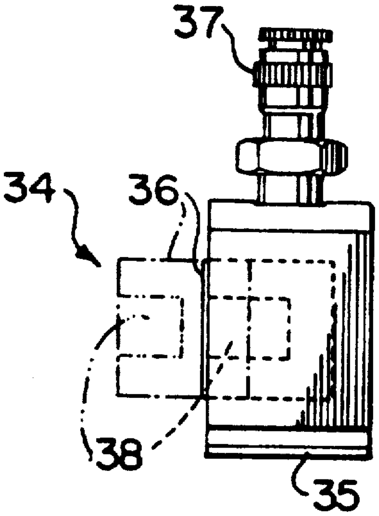
FIG. 5 is a side elevational view of the hydraulic press portion of the device.

A large threaded bolt 32 is threaded through the central aperture 16 of the plate 15. The threaded end of the bolt 32 is squared off, and is adapted to abut a hydraulic press 34, illustrated in FIGS. 1 and 5.

A strut clamp 19 is hinged to a square recess 18 at an opposing end of the plate 15, and cooperates with the rods 24 to engage the plate 15 to the spindle support. The strut clamp 19 is pivotally mounted to the plate 15 within the recess 18, by way of a pivot bolt 20.

Figure 7:
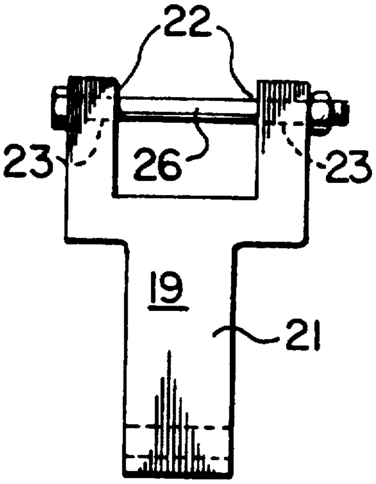
FIG. 7 is a side elevational view of the hinged strut clamp of the device.

Referring to FIG. 7, the strut clamp 19 is comprised of an arm 21, one end of which attaches to the pivot bolt 20, and the other end of which bifurcates into two prongs 22. Each prong 22 has an aperture 23 adjacent the free end thereof. A connecting bolt 26 is provided, and is adapted to be inserted through the apertures 23.

Referring to FIG. 1, a hydraulic press 34 is interposed between the threaded end of the bolt 32 and a collar 40. The hydraulic press 34 is more fully illustrated in FIG. 5 and is comprised of a body 35 having a piston 36 that may be forcibly extended therefrom, and a hydraulic valve 37 for the introduction of hydraulic fluid under pressure. Hydraulic lines and pumps for the provision of pressurized fluid are not illustrated, but are well known in the art. The piston 36 is provided with a circular recess 38 adapted to receive the free end of the bolt 32.

Figure 2:
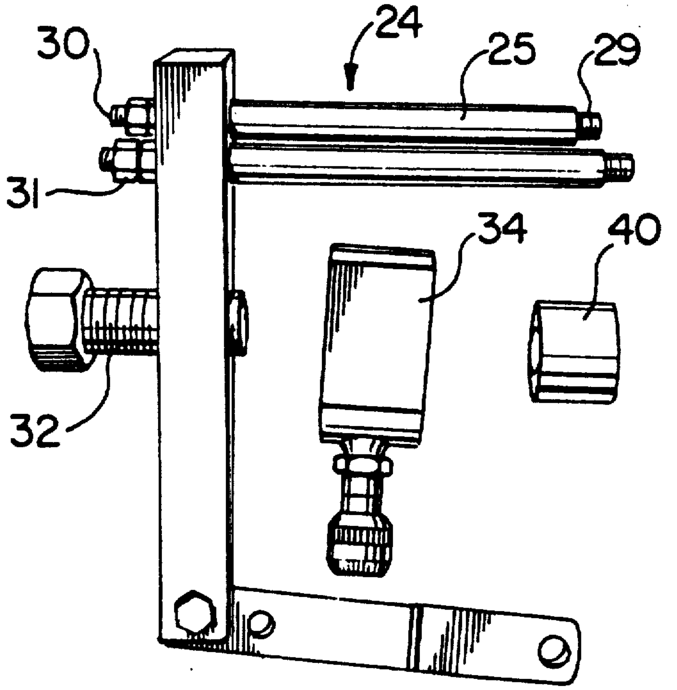
FIG. 2 is a perspective view of the three component parts of the device.
Figure 6:
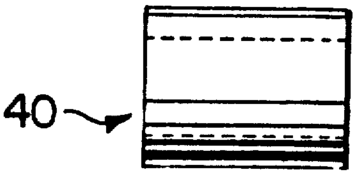
FIG. 6 is a side elevational view of the spacer portion of the device.

Referring to FIGS. 2 and 6, the collar 40 may be placed over the threaded portion 12 of the spindle 2, in order to protect it from damage. The collar 40 is illustrated in FIG. 1 positioned between the press 34 and the shoulder 13. The collar 40 is comprised of a thick-walled tubular member, and is slightly longer than the threaded portion 12 over which it fits.

In use, the collar 40 is positioned over the threaded portion 12, abutting the shoulder 13. The hydraulic press 34 is then positioned over the other end of the collar. The plate 15 is positioned over the hydraulic press 34.

As illustrated in FIG. 8, each of the rods 24 extending from the plate 15 is screw-threadedly engaged to the spindle support 3 and the strut clamp 19 (shown partly in section) is engaged to the strut rod support 6 by positioning the prongs 22 over the neck 14 of the strut rod support 6. The connecting bolt 26 is inserted through the apertures 23, and prevents the strut clamp 19 from being pulled past the arms 8 of the strut rod support 6.

The threaded bolt 32 is threaded through the aperture 16 of the plate 15, into the aperture 36 of the press 34. The bolt 32 is hand-tightened such that all slack is removed from the system. The hydraulic valve 37 is then opened to gradually apply a large amount of pressure to the spindle 2. Hydraulic presses known to the art apply ten thousand pounds or more of force, and this is sufficient to remove most such spindles.

It will be evident that the large forces at work in the use of such a tool necessitates the use of thick forged or cast steel or other suitably strong alloy parts throughout.

It will be seen that modifications may be made to the embodiment described herein, for example to adapt it for use in various makes of automobiles, without departing from the spirit and scope of the invention as defined in the appended claims.

The embodiments of the invention in which an exclusive property or privilege is claimed are defined as follows:

1. A tool for removing a spindle from a spindle support in a wheel assembly of a motor vehicle, said spindle having a free end and a fixed end engaged to a wheel, comprising: an attachment means to engage a frame to said spindle support in a spaced apart relation thereto, said attachment means includes an arm extending from said frame adapted to engage a strut rod support extending from said spindle support, said arm having a bifurcated free end, the gap therebetween bridged by a removable member adapted to releasably engage said strut rod support, whereby a hydraulic press positioned between said frame and said free end is adapted to apply a force therebetween.

2. A tool as claimed in claim 1 wherein said arm is hinged to said support.

* * * * *